Sept. 8, 1970          T. I. TAYLOR          3,527,689

SOLID ELECTROLYTE CELL CONSTRUCTION

Filed May 12, 1965

INVENTOR
THOMAS I. TAYLOR

BY *Hurvitz & Rose*

ATTORNEYS

United States Patent Office 3,527,689
Patented Sept. 8, 1970

3,527,689
SOLID ELECTROLYTE CELL CONSTRUCTION
Thomas I. Taylor, Leonia, N.J., assignor to Isomet Corporation, Palisades Park, N.J., a corporation of New Jersey
Filed May 12, 1965, Ser. No. 455,144
Int. Cl. B01k *3/04;* C23b *5/68*
U.S. Cl. 204—278                                      7 Claims

ABSTRACT OF THE DISCLOSURE

An electrochemical cell has a hollow elongate cylindrical solid electrolyte of uniform composition and unbroken surface area, the electrolyte being capable of ionic transfer through its wall via vacancies in its lattice structure. A plurality of spaced-apart gas previous electrode bands alternating in polarity of bias is provided along each of the inner and outer surfaces of the cylindrical electrolyte, the bands on the inner surfaces offset from the bands on the outer surface, such that each band occupies a region on its respective surface opposite an insulative gap on the other surface and overlaps to a substantial extent an adjacent band of opposite polarity on the other surface. Adjacent bands of like polarity on opposite surfaces of the cylindrical electrolyte are electrically connected in separate pairs via conductive material filling thru-holes in the wall of the electrolyte, but the electrically connected bands are substantially nonoverlapping with respect to one another.

The present invention relates generally to the construction of electrochemical cells, and more particularly to the construction of a solid electrolyte cell comprising several series connected cells.

In the copending applications of Willem Oser, Ser. No. 107,241, now Pat. No. 3,316,163, and 108,185, now Pat. No. 3,281,273, relating respectively to the regeneration of oxygen from oxygen-containing gases and to fuel cells wherein oxygen is continuously introduced into a region cotaining combustible fuel gases, the use of solid electrolytes of mixed oxides from the group consisting of $ZrO_2$, CaO, $ThO_2$, $Y_2O_3$ and $La_2O_3$ has been discussed in detail. The present invention has primary use in conjunction with such methods, but as will be apparent from the subsequent description is of practical importance in any electrochemical cell application wherein solid electrolytes are employed.

It is, accordingly a primary object of the present invention to provide improved methods for constructing electrochemical cells having solid electrolytes.

If electrochemical cells are electrically connected in parallel the electrical leads to the power supply or to the load circuit, depending upon whether the cell is used, for example, for the regeneration of oxygen from oxygen-containing gases or as a fuel cell, respectively, will carry high current necessitating the use of heavier leads than might otherwise be required. The heavier conductive leads in turn have accompanying disadvantages such as increasing the weight of the system, and increasing the degree of difficulty in making satisfactory electrical connections to the cells since in addition to heavy leads a separate connection is required between each cell and the external leads. It is therefore desirable when using solid electrolyte cells to electrically connect several cells in series, and to use or to obtain a correspondingly higher voltage with a relatively smaller current flow. In this manner a given current flow will pass through each cell in a series arrangement, and where the cells are used for generation of oxygen, for example, will enable such generation in an amount equivalent to that predictable from Faraday's law of electrolysis. When the cell is so used, appreciable amounts of oxygen can be generated with a relatively small current flow. Conversely, in the parallel connection the electronically conductive portions of the circuit will require a much higher current at lower voltage levels for the generation of an equivalent amount of oxygen.

Since it is advantageous to use the series connection of cells several methods of providing or attempting to provide such connections have been employed in the past, but none has been accomplished without considerable difficulty. As an example, in one method short hollow cylindrical segments of solid electrolytes are nested into one another, either by suitably tapering the inner and outer surfaces of each segment or by fabricating suitable bell-and-spigot joints. Both of these methods require the use of a ceramic-to-metal seal to hold the individual segments together, to provide a gas-tight seal, and to provide an electrically conducting path between successive segments. However, ceramic-to-metal seals having these desirable characteristics, and also having resistance to mechanical and thermal shock are not easily obtained, as will be attested to by persons skilled in the art.

It is, therefore, a further object of the present invention to provide improvements in solid electrolyte cell construction to permit ease and simplicity in series connecting a plurality of cells.

It is another object of the present invention to provide methods for connecting solid electrolyte cells in series without the necessity of employing ceramic-to-metal joints.

Still another object of the present invention is to provide a stronger, more reliable series electrical connection of solid electrolyte cells.

The above and still further objects, features and attendant advantages of the present invention will become apparent from a consideration of the following detailed description of specific embodiments thereof, especially when taken in conjunction with the accompanying drawings in which.

In the aforementioned Oser application Ser. No. 107,-241 there are described methods and apparatus for the decomposition of an oxygen-containing gas to provide oxygen for closed ecological systems such as long range submarines or manned space vehicles. In such systems carbon dioxide accumulates in the closed atmosphere, and it is proposed that solid electrolyte electrochemical cells be employed to decompose the carbon dioxide into oxygen and a carbon byproduct, the oxygen being pumped, or otherwise suitably transferred, back into the atmosphere of the closed system and the carbon byproduct being disposed of.

It has been found that certain mixed oxides, notably $ZrO_2$—$Y_2O_3$, $ThO_2$—$Y_2O_3$, $ZrO_2$—CaO, and $$ThO_2-La_2O_3$$

form anomalous mixed crystals, that is, solid solutions in which vacancies (holes) are distributed statistically at random throughout the anion component lattice. It is, therefore, possible for O-ions to migrate through the interstices of the solid eletcrolyte fluorite lattice structure, i.e., from hole to hole, in the presence of an electric field. Based on this principle an electrochemical cell may be constructed in which $CO_2$ is introduced into a region adjacent one electrode (cathode) and oxygen emerges at the other electrode (anode), the whole system, that is the entire electrochemical cell, being maintained at a temperature within a range above 800° C., and the magnitude of the electrical potential between cathode and anode being set to provide an electric field of sufficient strength to produce the desired decomposition rate.

The following example is illustrative of the method of preparation of a suitable solid electrolyte for use in electrochemical cells. A mixture of finely ground $ThO_2$ and $Y_2O_3$ having a composition of 72 mole percent $ThO_2$ and 28 mole percent $Y_2O_3$ will, under the conditions to be described, form a solid solution having the desired single phase fluorite lattice structure. Other combinations of such oxides are possible, for example, as follows:

(1) $ZrO_2$: 25% to 98%, $Y_2O_3$: 75% to 10%,
(2) $ZrO_2$: 87% to 95%, $CaO$: 13% to 5%,
(3) $ThO_2$: 72% to 99%, $Y_2O_3$: 28% to 1%,
(4) $ThO_2$: 43% to 99%, $La_2O_3$: 57% to 1%.

The ionic conductivity of the electrolyte will vary according to the composition of the mixture, but any composition within the cited ranges will produce the desired lattice structure when the steps described below are followed.

The mixture is pressed into the desired form at room temperature and then fired at approximately 1500° C. in an air atmosphere for five hours. After cooling the pressed mixture is reground, repressed and refired at 1500° C. for approximately five hours, this process being repeated until a gas tight structure possessing the desired single phase fluorite lattice is successfully prepared. The lattice structure may be verified by conventional analysis with an X-ray spectrometer.

Figure 1:
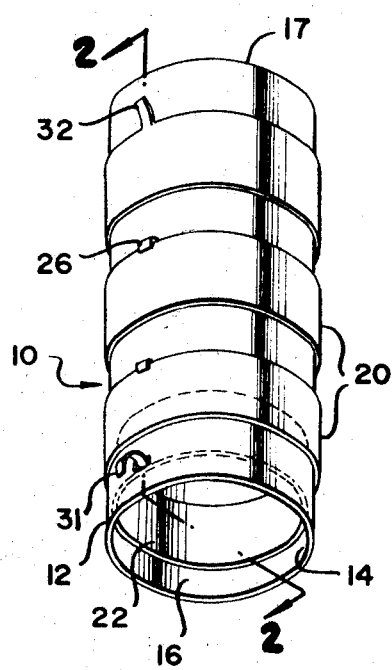
FIG. 1 is a perspective view of an embodiment of the present invention.

In the illustrated embodiment of the present invention the solid electrolyte mixture is pressed into the form of a hollow cylindrical tube which is closed at one end but it will be understood that other suitable configurations may be fabricated to meet a particular application. In FIG. 1, a structure in the form of a cylindrical tube having the aforementioned composition, more specifically, comprising a mixed oxide solid electrolyte having a complete cation lattice and a deficient anion lattice in a fluorite lattice structure, is shown generally at 10. The tube has an outer surface 12, an inner surface 14 and a pair of ends 16 and 17, opened and closed, respectively. A plurality of conductive electrode bands 20 are disposed longitudinally along the outer surface 12 of the tube in any convenient manner. The bands 20 may, for example, be applied in parallel circumferential strips of platinum paint or an aqueous suspension of ammonium chloroplatinate. Each strip or band 20 is preferably of equal width and is spaced from adjacent strips by the unpainted areas of surface 12.

Figure 2:
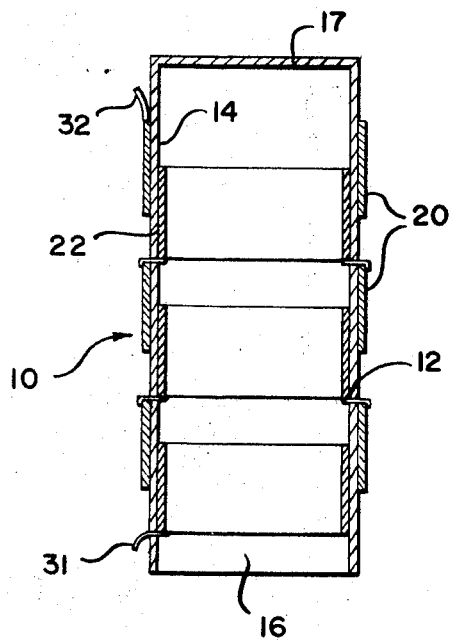
FIG. 2 is a sectional view taken along the lines 2—2 of FIG. 1.

As will readily be discernible from a consideration of FIG. 2 in conjunction with FIG. 1, a plurality of bands corresponding generally in number and dimensions is similarly disposed longitudinally along the inner surface 14 of cylindrical tube 10, the inner bands 22 being offset or displaced slightly with respect to the outer bands 20. Hence, a portion of each inner band overlaps a portion of each outer band respectively as one proceeds down the tube from one end to the other. The inner bands or strips 22 may conveniently be applied to the inner surface 14 of the tube by painting or coating the entire inner surface with a suitable conductive material which will act as an electrode, for example, the platinum compositions described above. After firing to convert the platinum paint to metallic platinum (approximately 700° firing temperature for ammonium chloroplatinate) in the form of a thin layer of porous, i.e., gas-pervious, electrically conductive material which is strongly adherent to the electrolyte surfaces, a grinding tool may be used to remove portions of the metallic platinum in alternate strips or bands, thereby leaving the alternating conductive and nonconductive areas substantially as illustrated in FIGS. 1 and 2. Firing of the solid electrolyte tube to convert the platinum composition to metallic platinum may be performed in any conventional manner, and is preferably accomplished subsequent to the placing of the conductive areas on both inner and outer surfaces of the tube.

These conductive strips or bands on both inner and outer surfaces will therefore permit gases introduced (or to be removed) at a region adjacent the surfaces to penetrate the electrodes. An exemplary environment in which the solid electrolyte may be used will be subsequently discussed in conjunction with FIG. 3.

A plurality of apertures 26 are provided through the tube wall intersecting one end of each outer electrode band or strip and the opposite end of the next adjacent inner electrode. The apertures, in any appropriate form such as holes or slits, may be conveniently drilled using an abrasive air jet gun. Each aperture is then filled with an electronically conducting, as distinguished from ionically conducting, material such as a gold-nickel alloy or platinum which is subsequently fused in position to seal the aperture and to provide an electronically conducting path from an inner band to the next respective outer band. Terminals or leads 31 and 32 are connected to inner and outer bands, respectively, at opposite ends of the tube for connection to power source or load depending upon the practical application in which the electrochemical cell is employed.

If terminal or lead 31 is positively biased, electrically, relative to lead or terminal 32 and suitable gaseous mixture introduced adjacent the outer wall, gaseous ions will be transported from the outer to the inner surface of the wall of the tube resulting in current flow from terminal 31 alternately outwardly and inwardly of the wall to terminal 32. It will be apparent that in the described embodiment, and in configurations similar thereto, the individual cells are connected electrically in series without any necessity for providing ceramic-to-metal seals from one segment to another. Each migrating ion, such as an oxygen ion which has gained a pair of electrons at each outer band 20, migrates through the wall of the tube via the holes in the lattice structure of the electrolyte and loses the two originally gained electrons at the respective band 22 along the inner surface of the tube. Oxygen gas is thus obtained at a region adjacent the interior surface of the tube.

Figure 3:
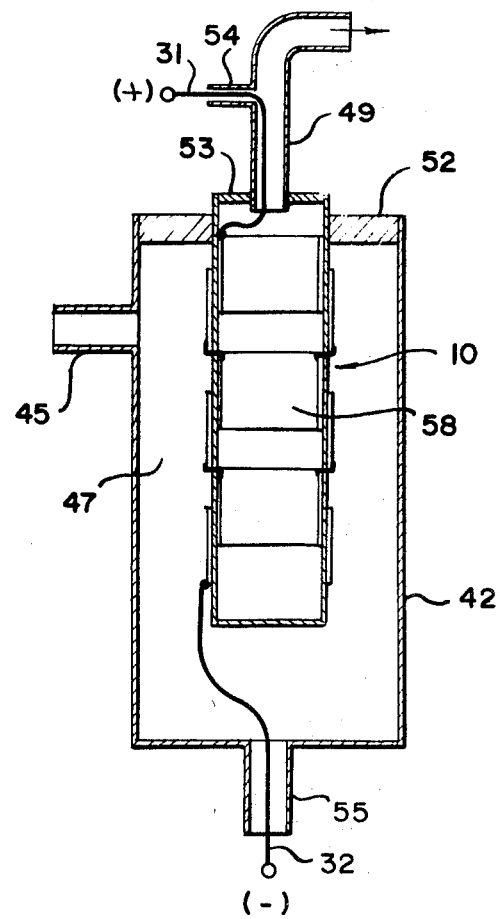
FIG. 3 is a sectional view of the embodiment of FIG. 1 employed in an electrochemical cell.

Referring now to FIG. 3 there is illustrated a system which may, with certain modifications, be used either as apparatus for the regeneration of oxygen from oxygen-containing gases or, alternatively, as a fuel cell in which oxygen from oxygen-containing gas is reacted with combustible fuel gases. As shown, the apparatus is employed in the re-generation of oxygen. To this end, the solid electrolyte tube 10 with conductive bands thereon is positioned in an electrochemical cell having an outer housing 42 fabricated of temperature resistant material such as a high silica content glass having low co-efficient of expansion, for example that sold under the trade name "Vycor."

The housing 42 has an inlet duct 45 for introducing oxygen-containing gas into the region or chamber 47 adjacent the outer surface of electrolyte 10. A single outlet duct 55 is provided for withdrawing oxygen-depleted gas from the system.

Appropriate seals, such as 52, 53, 54 are provided to close the cell in areas where gas losses or leaks would otherwise be present. Leads 31 and 32 are connected to a source of electrical energy (not shown) so that the electrode to which lead 31 is connected is at a positive bias relative to that at which lead 32 is connected. A duct 49 is provided to remove oxygen which forms in the interior chamber 58 when the cell or cells are operated under the aforementioned conditions at temperatures ranging above 700° C.

While I have disclosed certain embodiments of my invention, it will be apparent that various changes and modifications in the details of construction and operation may be resorted to without departing from the true spirit and scope of the invention as defined by the appended claims.

I claim:

1. In electrochemical cell apparatus, a solid electrolyte of homogeneous unitary continuous construction with a pair of substantially parallel surfaces, said electrolyte being capable of transferring ions via vacancies in the lattice structure thereof from one of said surfaces to the other of said surfaces, a plurality of parallel electronically conductive gas-pevious bands separated by electronically nonconductive regions along said one surface, a further plurality of parallel electronically conductive gas-pervious bands separated by electronically nonconductive regions along said other surfaces and displaced relative to said first-named plurality of bands so that portions of each of said first-named bands and further bands are respectively superposed to form opposite surface pairs of conductive bands, means electrically connecting a band on said one surface to a band on said other surface, said connected bands being in adjacent pairs, so that adjacent pairs of bands are series-connected, and electrical terminals connected respectively to a band at one end of said one surface and to a band at the opposite end of said other surface, said nonconductive regions on said one surface and said other surface constituting only unbroken continuous portions of said electrolyte between said parallel conductive gas-pervious bands.

2. The combination according to claim 1 wherein said pairs of conductive bands are electrically biased to form cathode and anode, and wherein said electrolyte comprises a mixed oxide solid solution having a complete cation lattice and a deficient anion lattice in a fluorite lattice structure.

3. The combination according to claim 2 including means for introducing an oxygen-containing gas into a region adjacent said cathode, means for connecting a source of electrical energy between said anode and said cathode, and means for withdrawing oxygen from a region adjacent said anode.

4. The combination according to claim 1 wherein said electrolyte is a tubular structure, said surfaces being the inner and outer surfaces of said tubular structure, said bands extending circumferentially about said inner and outer surfaces and spaced longitudinally one from the other therealong.

5. The combination according to claim 4 wherein said means electrically connecting said bands comprises a plurality of apertures extending through said inner and outer surfaces, said apertures being filled with electronically conductive material.

6. An electrochemical cell comprising:
a tubular solid electrolyte having a seamless, unbroken cylindrical wall of uniform structure and composition throughout, said wall being ionically conductive via vacancies in the lattice structure thereof,
a plurality of spaced electronically conductive gas-pervious bands on each surface of said cylindrical wall, the bands on one surface being longitudinally offset from the bands on the other surface, with each band occupying a superposed position relative to a substantial portion of the space between adjacent bands on the opposite surface and relative to substantial portions of only one of said adjacent bands,
means penetrating said wall approximately perpendicularly to said opposite surfaces for electrically connecting a band on said one surface to a substantially nonsuperposed adjacent band on said other surface to provide adjacent pairs of series-connected bands, and
electrical terminals connected respectively to end bands on said surfaces to provide energization points for said series-connected bands.

7. An electrochemical cell comprising:
a hollow elongate cylindrical solid electrolyte of uniform composition and unbroken surface area, said electrolyte capable of ionic transfer between surfaces thereof via vacancies in the lattice structure of said electrolyte,
a plurality of spaced-apart gas-pervious electrode bands alternating in polarity of bias along each of the inner and outer surfaces of said cylindrical electrolyte, the bands on the inner surface offset from the bands on the outer surface such that each band occupies a region on its respective surface opposite an insulative gap on the other surface and overlaps to a substantial extent an adjacent band of opposite polarity on said other surface,
means including thru-holes filled with conductive material electrically connecting adjacent bands of like polarity on opposite surfaces in separate pairs, the electrically connected bands being substantially non-overlapping with respect to one another,
the interior of said cylindrical electrolyte forming a gas chamber,
a housing encompassing said cylindrical electrolyte and forming a further gas chamber exteriorly of said electrolyte,
means sealing the ends of said electrolyte and sealing said housing to prevent communication between said chambers except via the wall of said cylindrical electrolyte, and
conduit means permitting ingress and egress of gas with respect to said chambers and points exterior to said housing.

References Cited

UNITED STATES PATENTS

| | | | |
|---|---|---|---|
| 3,188,283 | 6/1965 | Cole | 204—272 XR |
| 3,216,911 | 11/1965 | Kronenberg | 204—272 |
| 3,316,163 | 4/1967 | Oser | 204—129 |
| 3,347,767 | 10/1967 | Hickam | 204—195 |

JOHN H. MACK, Primary Examiner

D. R. JORDAN, Assistant Examiner